(12) United States Patent
Rodrigues et al.

(10) Patent No.: US 10,583,560 B1
(45) Date of Patent: Mar. 10, 2020

(54) ROBOTIC SYSTEM WITH OBJECT IDENTIFICATION AND HANDLING MECHANISM AND METHOD OF OPERATION THEREOF

(71) Applicant: Mujin, Inc., Tokyo (JP)

(72) Inventors: Jose Jeronimo Moreira Rodrigues, Tokyo (JP); Xutao Ye, Tokyo (JP); Jinze Yu, Tokyo (JP); Rosen Diankov, Tokyo (JP)

(73) Assignee: Mujin, Inc., Tokyo (JP)

( * ) Notice: Subject to any disclaimer, the term of this patent is extended or adjusted under 35 U.S.C. 154(b) by 0 days.

(21) Appl. No.: 16/374,617

(22) Filed: Apr. 3, 2019

(51) Int. Cl.
  *B25J 9/16* (2006.01)
  *B65G 1/137* (2006.01)
  (Continued)

(52) U.S. Cl.
  CPC ........... *B25J 9/1661* (2013.01); *B25J 9/1664* (2013.01); *B65G 1/137* (2013.01);
  (Continued)

(58) Field of Classification Search
  CPC combination set(s) only.
  See application file for complete search history.

(56) References Cited

U.S. PATENT DOCUMENTS 6,070,169 A * 5/2000 Shorter ................. G06F 16/289
9,427,874 B1   8/2016 Rublee
(Continued)

FOREIGN PATENT DOCUMENTS

JP   2018158391 A   10/2018

OTHER PUBLICATIONS

Krisnawan Rahardja et al. "Vision-Based Bin-Picking: Recognition and Localization of Multiple Complex Objects Using Simple Visual Cues" (published in:) 1996 IEEE/RSJ International Conference of Intelligent Robots and Systems, Nov. 4, 1996, 10 pages.

*Primary Examiner* — Kyle O Logan
(74) *Attorney, Agent, or Firm* — Perspectives Law Group, Corp.

(57) ABSTRACT

A robotic system includes: a control unit configured to: receive an object set including one or more object entries, wherein: the object entries correspond to source objects of an object source, each of the object entries are described by one or more object entry properties; receive sensor information representing one or more detectable object properties for detectable source objects of an object source; calculate an object match probability between the detectable source objects and the object entries based on a property correlation between the detectable object properties of the detectable source objects and the object entry properties of the object entries; generate an object identity approximation for each of the detectable source objects based on a comparison between the object match probability for each of the detectable source objects corresponding to a particular instance of the object entries; select a target object from the detectable source objects; generate an object handling strategy, for implementation by an object handling unit, to transfer the target object from the object source based on the object entry properties of the object entries corresponding to the object identity approximation; update the object set to indicate that the target object corresponding to a specific instance of the object entries has been removed from the object source; and a storage unit 204, coupled to the control unit, configured to store the object set.

17 Claims, 6 Drawing Sheets

(51) Int. Cl.
*G06K 9/62* (2006.01)
*G06K 9/00* (2006.01)

(52) U.S. Cl.
CPC ...... *B65G 2201/02* (2013.01); *G06K 9/00624* (2013.01); *G06K 9/6201* (2013.01); *G06K 2209/19* (2013.01)

(56) References Cited

U.S. PATENT DOCUMENTS

| | | |
|---|---|---|
| 9,454,708 B2 | 9/2016 | Miyakoshi |
| 9,561,587 B2 | 2/2017 | Wellman et al. |
| 9,987,746 B2 | 6/2018 | Bradski et al. |
| 10,350,755 B2 | 7/2019 | Wagner et al. |
| 2008/0181485 A1 | 7/2008 | Beis et al. |
| 2014/0355838 A1 | 12/2014 | Miyakoshi |
| 2016/0167227 A1* | 6/2016 | Wellman ................ B25J 9/1612 700/259 |
| 2016/0221187 A1 | 8/2016 | Bradski et al. |
| 2017/0225330 A1 | 8/2017 | Wagner et al. |
| 2018/0272535 A1 | 9/2018 | Ogawa et al. |

\* cited by examiner

ROBOTIC SYSTEM WITH OBJECT IDENTIFICATION AND HANDLING MECHANISM AND METHOD OF OPERATION THEREOF

TECHNICAL FIELD

The present technology is directed generally to robotic systems and, more specifically, to systems, processes, and techniques for identifying and handling of objects

BACKGROUND

Modern robotics and automation are providing increasing levels of functionality to support in industrial settings, such as manufacturing facilities, receiving and distribution centers, and warehouses. Research and development in the existing technologies can take a myriad of different directions.

As users become more empowered with the growth of robotic systems, new and old paradigms begin to take advantage of this new technology space. There are many technological solutions to take advantage of these new capabilities to enhance or augment automation of robotic systems, such as the capability for the robotic systems to autonomously handle various objects. However, users are not provided the option rely on the robotic systems to accurately and efficiently identify objects from a collection of objects in a consistent manner.

Thus, a need still remains for a robotics system with an object handling mechanism for operation of an object handling unit. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a robotic system, including: a control unit configured to: receive an object set including one or more object entries, wherein: the object entries correspond to source objects of an object source, each of the object entries are described by one or more object entry properties; receive sensor information representing one or more detectable object properties for detectable source objects of an object source; calculate an object match probability between the detectable source objects and the object entries based on a property correlation between the detectable object properties of the detectable source objects and the object entry properties of the object entries; generate an object identity approximation for each of the detectable source objects based on a comparison between the object match probability for each of the detectable source objects corresponding to a particular instance of the object entries; select a target object from the detectable source objects; generate an object handling strategy, for implementation by an object handling unit, to transfer the target object from the object source based on the object entry properties of the object entries corresponding to the object identity approximation; update the object set to indicate that the target object corresponding to a specific instance of the object entries has been removed from the object source; and a storage unit 204, coupled to the control unit, configured to store the object set.

An embodiment of the present invention provides a method of operation of a robotic system including: receiving an object set of including one or more object entries, wherein: the object entries correspond to source objects of an object source, each of the object entries are described by one or more object entry properties; receiving sensor information representing one or more detectable object properties for detectable source objects of an object source; calculating an object match probability between the detectable source objects and the object entries based on a property correlation between the detectable object properties of the detectable source objects and the object entry properties of the object entries; generating an object identity approximation for each of the detectable source objects based on a comparison between the object match probability for each of the detectable source objects corresponding to a particular instance of the object entries; selecting a target object from the detectable source objects; generating an object handling strategy, for implementation by an object handling unit, to transfer the target object from the object source based on the object entry properties of the object entries corresponding to the object identity approximation; and updating the object set to indicate that the target object corresponding to a specific instance of the object entries has been removed from the object source.

An embodiment of the present invention provides a non-transitory computer readable medium including instructions executable by a control circuit for a robotic system, the instructions including: receiving an object set of object entries, wherein: the object entries correspond to source objects of an object source, each of the object entries are described by one or more object entry properties; receiving sensor information representing one or more detectable object properties for detectable source objects of an object source; calculating an object match probability between the detectable source objects and the object entries based on a property correlation between the detectable object properties of the detectable source objects and the object entry properties of the object entries; generating an object identity approximation for each of the detectable source objects based on comparison between the object match probability for each of the detectable source objects corresponding to a particular instance of the object entries; selecting a target object from the detectable source objects; generating an object handling strategy, for implementation by an object handling unit, to transfer the target object from the object source based on the object entry properties of the object entries corresponding to the object identity approximation; and updating the object set to indicate that the target object corresponding to a specific instance of the object entries has been removed from the object source.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
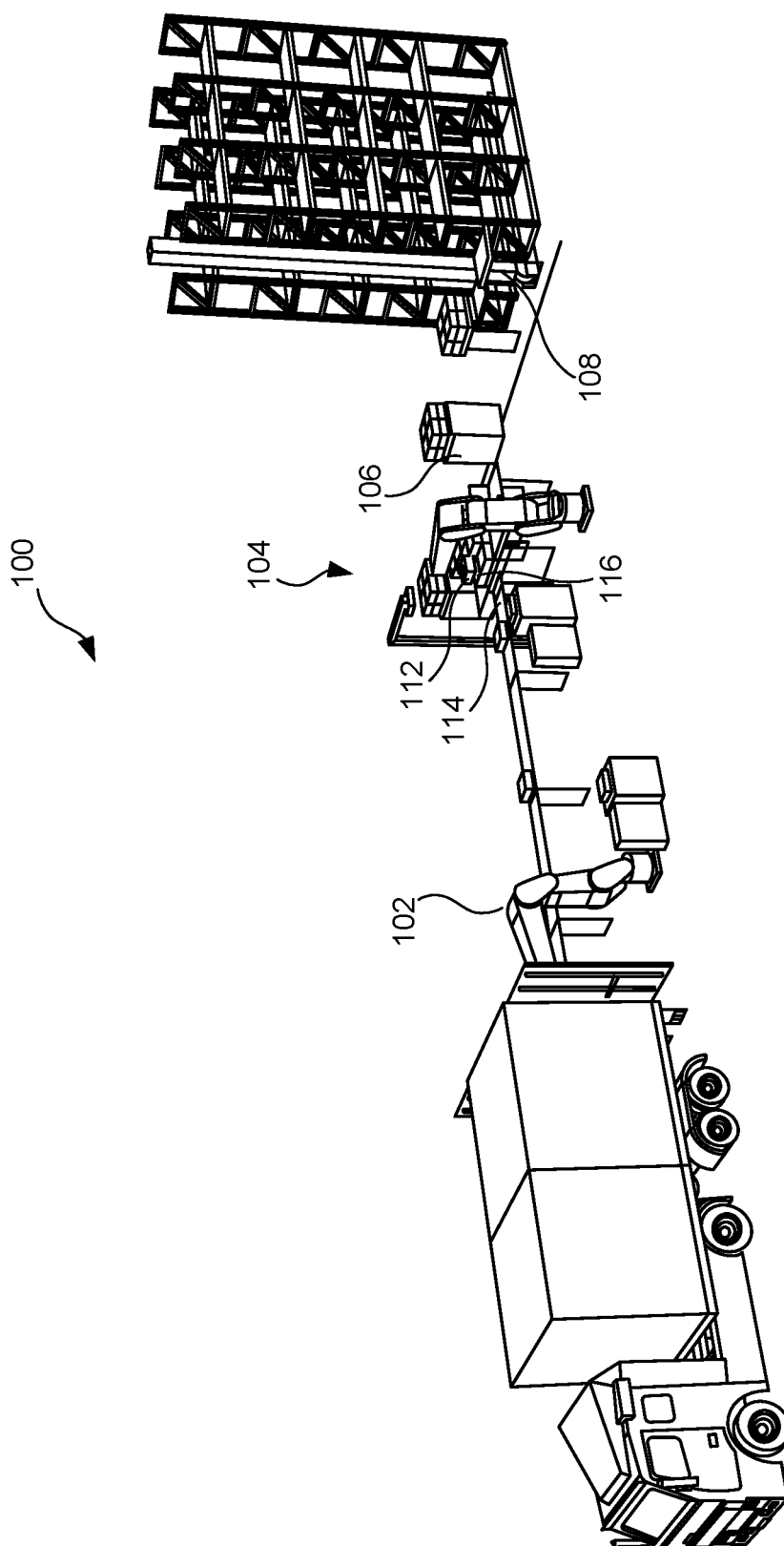
FIG. 1 is an example environment in which a robotic system with an object handling mechanism can operate.

In the following description, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments.

It is to be understood that the various embodiments shown in the figures are merely illustrative representations. Further, the drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer-executable or controller-executable instructions, including routines executed by a programmable computer or controller. Those skilled in the relevant art will appreciate that the disclosed techniques can be practiced on computer or controller systems other than those shown and described below. The techniques described herein can be embodied in a special-purpose computer or data processor that is specifically programmed, configured, or constructed to execute one or more of the computer-executable instructions described below. Accordingly, the terms "computer" and "controller" as generally used herein refer to any data processor and can include Internet appliances and handheld devices, including palm-top computers, wearable computers, cellular or mobile phones, multi-processor systems, processor-based or programmable consumer electronics, network computers, mini computers, and the like. Information handled by these computers and controllers can be presented at any suitable display medium, including a liquid crystal display (LCD). Instructions for executing computer- or controller-executable tasks can be stored in or on any suitable computer-readable medium, including hardware, firmware, or a combination of hardware and firmware. Instructions can be contained in any suitable memory device, including, for example, a flash drive, USB device, and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements co-operate or interact with each other (e.g., as in a cause-and-effect relationship, such as for signal transmission/reception or for function calls), or both.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

Referring now to FIG. 1, therein is shown an example environment in which a robotic system 100 with an object handling mechanism can operate. The operating environment for the robotic system 100 can includes one or more structures, such as robots or robotic devices, configured to execute one or more tasks. Aspects of the object handling mechanism can be practiced or implemented by the various structures.

In the example illustrated in FIG. 1, the robotic system 100 can include an unloading unit 102, a transfer unit 104, a transport unit 106, a loading unit 108, or a combination thereof in a warehouse, a distribution center, or a shipping hub. Each of the units in the robotic system 100 can be configured to execute one or more tasks. The tasks can be combined in sequence to perform an operation that achieves a goal, for example, such as to unload objects from a vehicle, such as a truck, trailer, a van, or train car, for storage in a warehouse or to unload objects from storage locations and load them onto a vehicle for shipping. In another example, the task can include moving objects from one location, such as a container, bin, cage, basket, shelf, platform, pallet, or conveyor belt, to another location. Each of the units can be configured to execute a sequence of actions, such as operating one or more components therein, to execute a task.

In some embodiments, the task can include interaction with a target object 112, such as manipulation, moving, reorienting or a combination thereof, of the object. The target object 112 is the object that will be handled by the robotic system 100. More specifically, the target object 112 can be the specific object among many objects that is the target of an operation or task by the robotics system 100. For example, the target object 112 can be the object that the robotic system 100 has selected for or is currently being handled, manipulated, moved, reoriented, or a combination thereof. The target object 112, as examples, can include boxes, cases, tubes, packages, bundles, an assortment of individual items, or any other object that can be handled by the robotic system 100.

As an example, the task can include transferring the target object 112 from an object source 114 to a task location 116. The object source 114 is a receptacle for storage of objects. The object source 114 can include numerous configurations and forms. For example, the object source 114 can be a platform, with or without walls, on which objects can be placed or stacked, such as a pallet, a shelf, or a conveyor belt. As another, the object source 114 can be a partially or fully enclosed receptacle with walls or lid in which objects can be placed, such as a bin, cage, or basket. In some embodiments, the walls of the object source 114 with the partially or fully enclosed can be transparent or can include openings or gaps of various sizes such that portions of the objects contained therein can be visible or partially visible through the walls.

FIG. 1 illustrates examples of the possible functions and operations that can be performed by the various units of the robotic system 100 in handling the target object 112 and it is understood that the environment and conditions can differ from those described hereinafter. For example, the unloading unit 102 can be a vehicle offloading robot configured to transfer the target object 112 from a location in a carrier, such as a truck, to a location on a conveyor belt. Also, the transfer unit 104, such as a palletizing robot, can be configured to transfer the target object 112 from a location on the conveyor belt to a location on the transport unit 106, such as for loading the target object 112 on a pallet on the transport unit 106. In another example, the transfer unit 104 can be a piece-picking robot configured to transfer the target object 112 from one container to another container. In completing the operation, the transport unit 106 can transfer the target object 112 from an area associated with the transfer unit 104 to an area associated with the loading unit 108, and the loading unit 108 can transfer the target object 112, such as by moving the pallet carrying the target object 112, from the transfer unit 104 to a storage location, such as a location on the shelves. Details regarding the task and the associated actions are described below.

For illustrative purposes, the robotic system 100 is described in the context of a shipping center; however, it is understood that the robotic system 100 can be configured to execute tasks in other environments or for other purposes, such as for manufacturing, assembly, packaging, healthcare, or other types of automation. It is also understood that the robotic system 100 can include other units, such as manipulators, service robots, modular robots, that are not shown in FIG. 1. For example, in some embodiments, the robotic system 100 can include a depalletizing unit for transferring the objects from cages, carts, or pallets onto conveyors or other pallets, a container-switching unit for transferring the objects from one container to another, a packaging unit for wrapping the objects, a sorting unit for grouping objects according to one or more characteristics thereof, a piece-picking unit for manipulating the objects differently, such as sorting, grouping, and/or transferring, according to one or more characteristics thereof, or a combination thereof.

Figure 2:
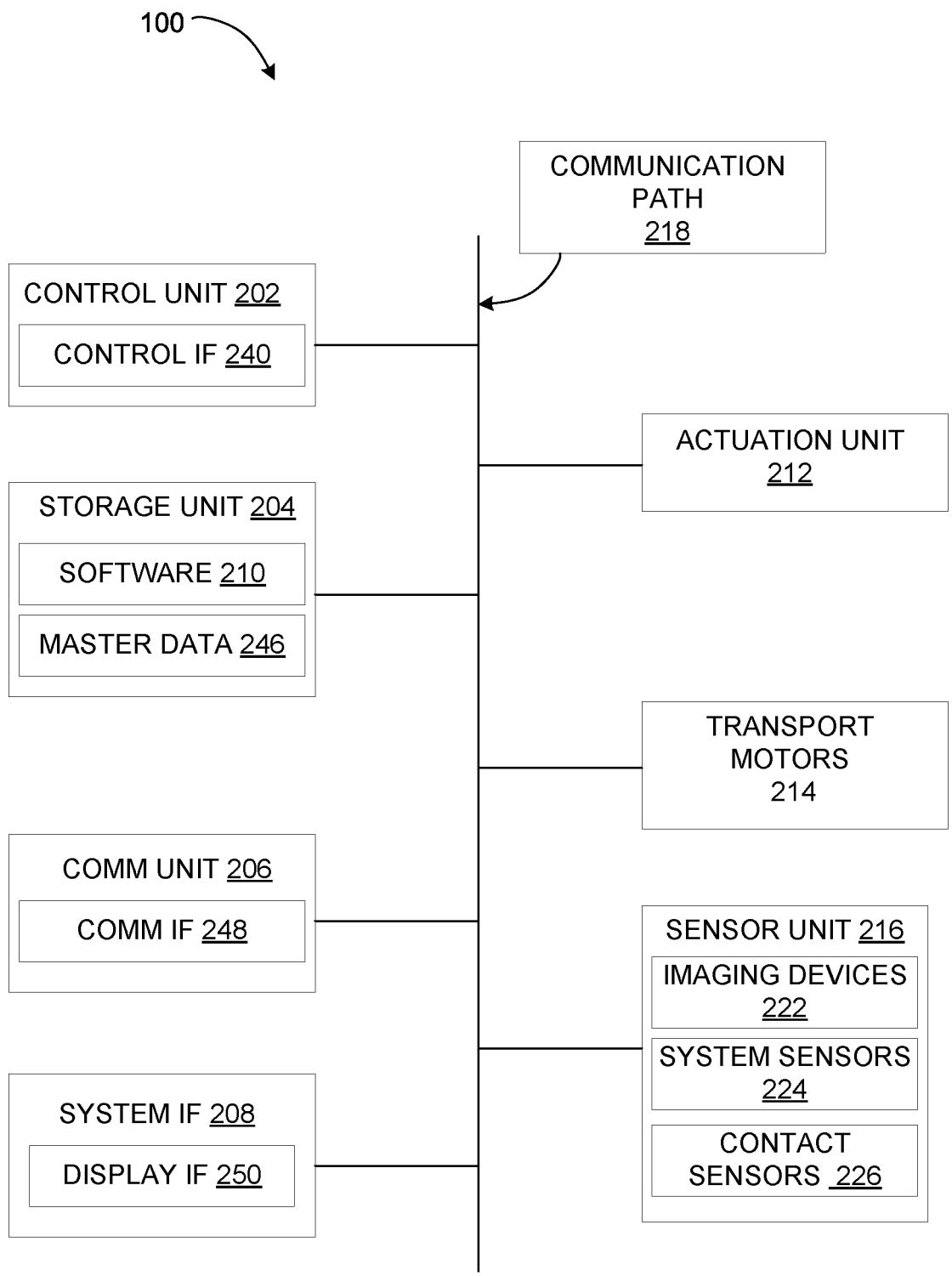
FIG. 2 is a block diagram illustrating the robotic system in accordance with one or more embodiments of the present invention.

Referring now to FIG. 2, therein is shown a block diagram illustrating the robotic system 100 in accordance with one or more embodiments of the present invention. In some embodiments, for example, the robotic system 100 can include electronic devices, electrical devices, or a combination thereof, such as a control unit 202, a storage unit 204, a communication unit 206, a system interface 208, one or more actuation devices 212, one or more transport motors 214, one or more sensor units 216, or a combination thereof that are coupled to one another, integrated with or coupled to one or more of the units or robots described in FIG. 1 above, or a combination thereof.

The control unit 202 can be implemented in a number of different ways. For example, the control unit 202 can be a processor, an application specific integrated circuit (ASIC), an embedded processor, a microprocessor, a hardware control logic, a hardware finite state machine (FSM), a digital signal processor (DSP), or a combination thereof. The control unit 202 can execute a software 210 to provide the intelligence of the robotic system 100.

The control unit 202 can include a control interface 240. The control interface 240 can be used for communication between the control unit 202 and other functional units in the robotic system 100. The control interface 240 can also be used for communication that is external to the robotic system 100. The control interface 240 can receive information from the other functional units or from external sources, or can transmit information to the other functional units or to external destinations. The external sources and the external destinations refer to sources and destinations external to the robotic system 100.

The control interface 240 can be implemented in different ways and can include different implementations depending on which functional units or external units are being interfaced with the control interface 240. For example, the control interface 240 can be implemented with a pressure sensor, an inertial sensor, a microelectromechanical system (MEMS), optical circuitry, waveguides, wireless circuitry, wireline circuitry, application programming interface, or a combination thereof.

The storage unit 204 can store the software 210, master data 246, or a combination thereof. For illustrative purposes, the storage unit 204 is shown as a single element, although it is understood that the storage unit 204 can be a distribution of storage elements. Also for illustrative purposes, the robotic system 100 is shown with the storage unit 204 as a single hierarchy storage system, although it is understood that the robotic system 100 can have the storage unit 204 in a different configuration. For example, the storage unit 204 can be formed with different storage technologies forming a memory hierarchal system including different levels of caching, main memory, rotating media, or off-line storage.

The storage unit 204 can be a volatile memory, a nonvolatile memory, an internal memory, an external memory, or a combination thereof. For example, the storage unit 204 can be a nonvolatile storage such as non-volatile random access memory (NVRAM), Flash memory, disk storage, or a volatile storage such as static random access memory (SRAM). As a further example, storage unit 204 can be a non-transitory computer medium including the non-volatile memory, such as a hard disk drive, NVRAM, solid-state storage device (SSD), compact disk (CD), digital video disk (DVD), or universal serial bus (USB) flash memory devices. The software 210 can be stored on the non-transitory computer readable medium to be executed by a control unit 202.

The storage unit 204 can include a control interface 240. The control interface 240 can be used for communication between the storage unit 204 and other functional units in the robotic system 100. The control interface 240 can also be used for communication that is external to the robotic system 100. The control interface 240 can receive information from the other functional units or from external sources, or can transmit information to the other functional units or to external destinations. The external sources and the external destinations refer to sources and destinations external to the robotic system 100.

The control interface 240 can include different implementations depending on which functional units or external units are being interfaced with the storage unit 204. The control interface 240 can be implemented with technologies and techniques similar to the implementation of the control interface 240.

In one embodiment, the storage unit 204 can be used to further store and provide access to processing results, predetermined data, thresholds, or a combination thereof. For example, the storage unit 204 can store the master data 246 that includes descriptions of the one or more target objects 104, for example, boxes, box types, cases, case types, products, or a combination thereof. In one embodiment, the master data 246 can include a dimension, a shape, for example, templates for potential poses or computer-generated models for recognizing the one or more target objects 104 in different poses, a color scheme, an image, identification information, for example, bar codes, quick response (QR) codes, logos, expected locations, an expected weight, or a combination thereof, for the one or more target objects 104 expected to be manipulated by the robotic system 100.

In one embodiment, the master data 246 can further include manipulation-related information regarding the one or more objects that can be encountered or handled by the robotic system 100. For example, the manipulation-related information for the objects can include a center-of-mass location on each of the objects, expected sensor measurements, for example, for force, torque, pressure, or contact measurements, corresponding to one or more actions, maneuvers, or a combination thereof.

The communication unit 206 can enable external communication to and from the robotic system 100. For example, the communication unit 206 can enable the robotic system 100 to communicate with other robotic systems or units, external devices, such as an external computer, an external database, an external machine, an external peripheral device, or a combination thereof, through a communication path 218, such as a wired or wireless network.

The communication path 218 can span and represent a variety of networks and network topologies. For example, the communication path 218 can include wireless communication, wired communication, optical communication, ultrasonic communication, or the combination thereof. For example, satellite communication, cellular communication, Bluetooth, Infrared Data Association standard (IrDA), wireless fidelity (WiFi), and worldwide interoperability for microwave access (WiMAX) are examples of wireless communication that can be included in the communication path 218. Cable, Ethernet, digital subscriber line (DSL), fiber optic lines, fiber to the home (FTTH), and plain old telephone service (POTS) are examples of wired communication that can be included in the communication path 218. Further, the communication path 218 can traverse a number of network topologies and distances. For example, the communication path 218 can include direct connection, personal area network (PAN), local area network (LAN), metropolitan area network (MAN), wide area network (WAN), or a combination thereof. The robotic system 100 can transmit information between the various units through the communication path 218. For example, the information can be transmitted between the control unit 202, the storage unit 204, the communication unit 206, the system interface 208, the actuation devices 212, the transport motors 214, the sensor units 216, or a combination thereof.

The communication unit 206 can also function as a communication hub allowing the robotic system 100 to function as part of the communication path 218 and not limited to be an end point or terminal unit to the communication path 218. The communication unit 206 can include active and passive components, such as microelectronics or an antenna, for interaction with the communication path 218.

The communication unit 206 can include a communication interface 248. The communication interface 248 can be used for communication between the communication unit 206 and other functional units in the robotic system 100. The communication interface 248 can receive information from the other functional units or from external sources, or can transmit information to the other functional units or to external destinations. The external sources and the external destinations refer to sources and destinations external to the robotic system 100.

The communication interface 248 can include different implementations depending on which functional units are being interfaced with the communication unit 206. The communication interface 248 can be implemented with technologies and techniques similar to the implementation of the control interface 240.

The user interface 216 can include an input device and an output device. Examples of the input device of the user interface 216 can include a keypad, a touchpad, soft-keys, a keyboard, a microphone, sensors for receiving remote signals, a camera for receiving motion commands, or any combination thereof to provide data and communication inputs. Examples of the output device can include a display interface 250. The display interface 250 can be any graphical user interface such as a display, a projector, a video screen, or any combination thereof.

The control unit 202 can operate the user interface 216 to present or receive information generated by the robotic system 100. The control unit 202 can operate the user interface 216 to present information generated by the robotic system 100. The control unit 202 can also execute the software 210 for the other functions of the robotic system 100. The control unit 202 can further execute the software 210 for interaction with the communication path 218 via the communication unit 206.

The robotic system 100 can include physical or structural members, such as robotic manipulator arms, that are connected at joints for motion, such as rotational displacement, translational displacements, or a combination thereof. The structural members and the joints can form a kinetic chain configured to manipulate an end-effector, such as a gripper, to execute one or more task, such as gripping, spinning, or welding, depending on the use or operation of the robotic system 100. The robotic system 100 can include the actuation devices 212, such as motors, actuators, wires, artificial muscles, electroactive polymers, or a combination thereof, configured to drive, manipulate, displace, reorient, or a combination thereof, the structural members about or at a corresponding joint. In some embodiments, the robotic system 100 can include the transport motors 214 configured to transport the corresponding units from place to place.

The robotic system 100 can include the sensor units 216 configured to obtain information used to execute tasks and operations, such as for manipulating the structural members or for transporting the robotic units. The sensor units 216 can include devices configured to detect or measure one or more physical properties of the robotic system 100, such as a state, a condition, a location of one or more structural members or joints, information about objects or surrounding environment, or a combination thereof. As an example, the sensor units 216 can include imaging devices 222, system sensors 224, contact sensors 226, or a combination thereof.

In some embodiments, the sensor units 216 can include one or more imaging devices 222. The imaging devices 222 are devices configured to detect the surrounding environment. For example, the imaging devices 222 can include 2-dimensional cameras, 3-dimensional cameras, both of which can include a combination of visual and infrared capabilities, lidars, radars, other distance-measuring devices, and other imaging devices. The imaging devices 222 can generate a representation of the detected environment, such as a digital image or a point cloud, used for implementing machine/computer vision for automatic inspection, robot guidance, or other robotic applications. As described in further detail below, the robotic system 100 can process the digital image, the point cloud, or a combination thereof via the control unit 202 to identify the target object 112 of FIG. 1, a pose of the target object 112 of, or a combination thereof. For manipulating the target object 112, the robotic system 100 can capture and analyze an image of a designated area, such as inside the truck, inside the container, or a pickup location for objects on the conveyor belt, to identify the target object 112 and the object source 114 of FIG. 1 thereof. Similarly, the robotic system 100 can capture and analyze an image of another designated area, such as a drop location for placing objects on the conveyor belt, a location for placing objects inside the container, or a location on the pallet for stacking purposes, to identify the task location 116 of FIG. 1.

In some embodiments, the sensor units 216 can include the system sensors 224. The system sensors 224 are devices to monitor the robotic units. For example, the system sensors 224 can include units or devices to detect and monitor positions of structural members, such as the robotic arms and the end-effectors, corresponding joints of robotic units or a combination thereof. As a further example, the robotic system 100 can use the system sensors 224 to track locations, orientations, or a combination thereof of the structural members and the joints during execution of the task. Examples of the system sensors 224 can include accelerometers, gyroscopes, or position encoders.

In some embodiments, the sensor units 216 can include the contact sensors 226, such as pressure sensors, force sensors, strain gauges, piezoresistive/piezoelectric sensors, capacitive sensors, elastoresistive sensors, torque sensors, linear force sensors, or other tactile sensors, configured to measure a characteristic associated with a direct contact between multiple physical structures or surfaces. For example, the contact sensors 226 can measure the characteristic that corresponds to a grip of the end-effector on the target object 112 or measure the weight of the target object 112. Accordingly, the contact sensors 226 can output a contact measure that represents a quantified measure, such as a measured force or torque, corresponding to a degree of contact or attachment between the gripper and the target object 112. For example, the contact measure can include one or more force or torque readings associated with forces applied to the target object 112 by the end-effector. Details regarding the contact measure are described below.

Figure 3:
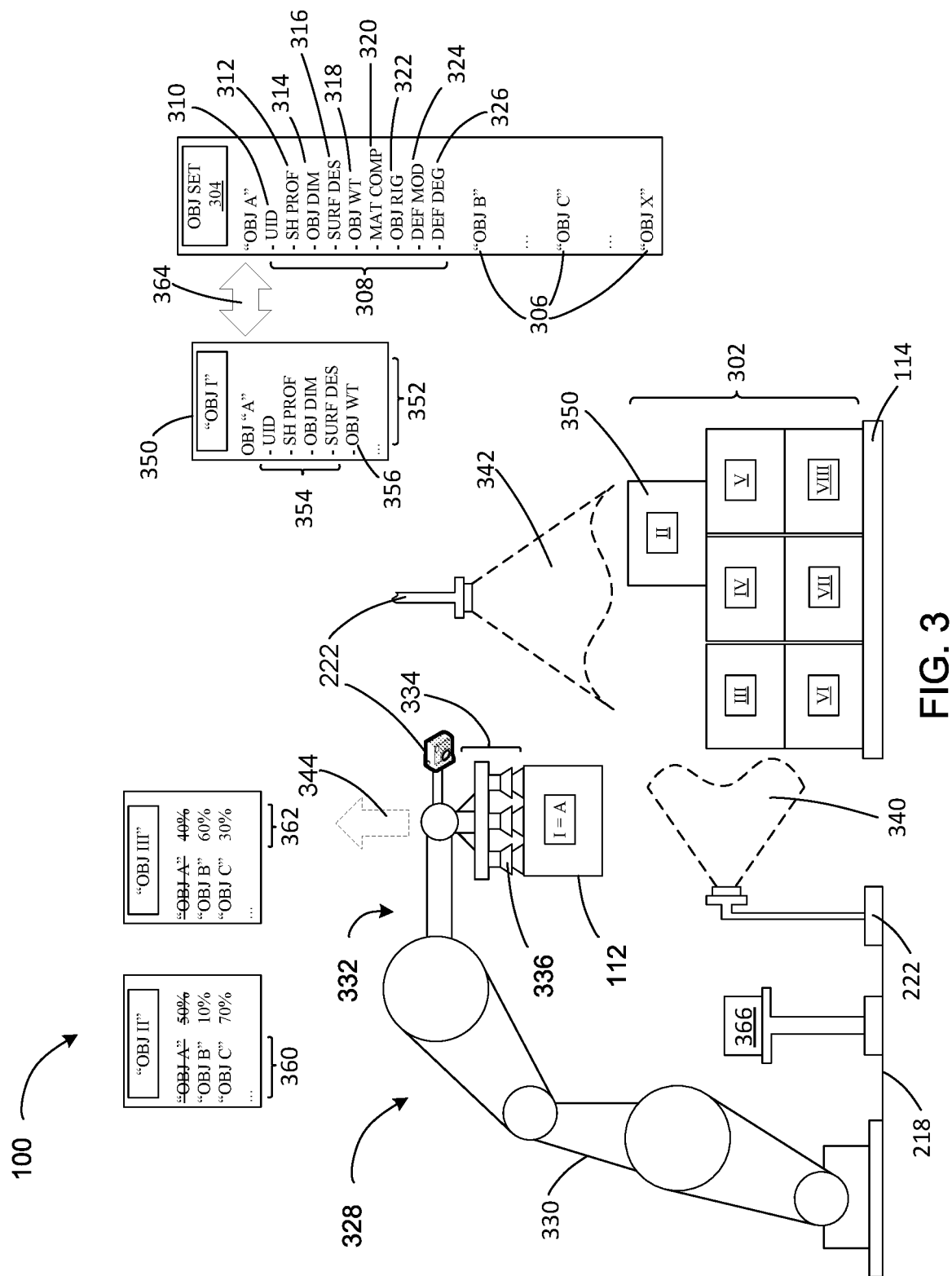
FIG. 3 is an example of the robotics system in identifying source objects of the object source in accordance with one or more embodiments of the present invention.

Referring now to FIG. 3, therein is shown an example of the robotic system 100 in determining an identity of source objects 302 of the object source 114 in accordance with one or more embodiments of the present invention. The source objects 302 are a collection of objects that are contained within or on the object source 114, according to the configuration of the object source 114 as described in FIG. 1. The source objects 302 can be a wide variety and assortment of items or objects that are similar to or different from one another in numerous properties, such as shape, size, color, composition, and contents. For example, as illustrated in FIG. 3, the source objects 302 can range from a uniformly arranged stack of boxes or an unordered pile of assorted items each positioned in random poses. The source objects 302 can include the target object 112. Also, for illustrative purposes, the object source 114 is shown as a pallet, although it is understood that the object source 114 can be any form of receptacle for the source objects 302 as described in FIG. 1. For example, in one embodiment, the source objects 302 of the object source 114 can be stacked on the object source 114 for configurations without one or more sides, lateral retaining structures, covers, or a combination thereof. In another embodiment, the source objects 302 of the source object 114 can be stored within the source object 114 for configurations that include sides, lateral retaining structures, covers or a combination thereof.

Each of the source objects 302 can be included in an object set 304. The object set 304 is an arrangement of information regarding the objects. The arrangement of information can include physical characteristics, attributes, and properties of the target object 112. In some embodiments, the object set 304 can include be a single property, characteristic, or attribute, or a group of property, characteristic, or attribute that describe a single object. In another embodiment, the object set 304 can be a group or sub-group of objects that share one or more property, characteristic, or attribute in common with one another, such as instances of the source objects 302 in the object set 304 that are of the same shape or have the same surface markings. As such, a single object can be included in one or more instances of the object set 304, and a single instance of the object source 302 can be associated with multiple instances of the object set 302. In a further embodiment, the object set 304 can be a registry of each of the source objects 302 associated with a particular instance of the object source 114. For example, the object set 304 as the registry of the source objects 302 can include object entries 306. The object entries 306 are data entries that correspond to a particular instance of the source object 302. The object set 304 can include one or more of the object entries 306, where each of the object entries 306 correspond to a specific instance of the source objects 302 that are contained in or are on the object source 114.

Each of the object entries 306 can include one or more object entry properties 308. The object entry properties 308 are description of the object entries 306. More specifically, the object entry properties 308 can be descriptions of physical characteristics, attributes, and properties of the object entries 306. The object entry properties 308 can be a wide variety of properties that describe the object entries 306 and corresponding instance of the source objects 302, including a unique identifier 310, such as barcode or a QR code; an object category, such as a product or item type; a shape profile 312, which can include surface contours and three dimensional shape descriptions, such as a rectangular box, a cylindrical tube, or a non-uniform shape; object dimensions 314, such as length, width, height, diameter, or combination thereof surface design schemes 316, such as coloring, markings, images, logos, and patterns; an object weight 318, which is a measurement of the weight and can include weight distribution and center of mass; exterior material composition 320, such as plastic, cardboard, or metal; the object surface texture; deformability characteristics, which can include object rigidity 322, deformation mode 324, deformation degree 326, or a combination thereof.

The object rigidity 322 is a description of the surface rigidity of an object. More specifically, the object rigidity 322 can describe the amount an object will deform when pressure is applied to a surface of the object, such as when squeezed or impacted.

The deformation mode 324 is a description of how the shape of the object will change when force is applied to the object. For example, the deformation mode 324 can describe how the shape of one of the source objects 302 will change when lifted from a resting state. As a specific example, the deformation mode 324 can indicate whether portions of the source object 302 will sag or bend when the object is lifted off a surface from a resting state.

The deformation degree 326 is the amount of shape distortion the object will undergo when force is applied to the object. For example, the deformation degree 326 can include a measure of the change in dimension, such as the maximum length of elongation, when the one of the source objects 302 is lifted off a surface from a rest state and suspended in the air.

In some embodiments, the object entry properties 308 can be classified into property types. For example, the property types for the object entry properties 308 can include imaging properties and contact properties. The imaging properties are instances of the object entry properties 308 that can be determined through the imaging devices 222 of FIG. 2. For example, the imaging type properties can include the unique identifier 310, the shape profile 312, the object dimensions 314, the surface design schemes 316, or a combination thereof. The contact properties are instances of the object entry properties 308 that can be determined through the contact sensors 226 of FIG. 2, such as the object weight 318, the exterior material composition 320, the object rigidity 322, or a combination thereof.

In some embodiments, the tasks can be implemented with an object handling unit 328. The object handling unit 328 is a machine that is configured to execute commands to automate object handling tasks. For example, the object handling unit 328 can be a robot configured to manipulate objects, such as a palletizing robot, a depalletizing robot, or a bin or shelf picking robot. As a further example, the unloading unit 102 of FIG. 1, the transfer unit 104 of FIG. 1, the transport unit 106 of FIG. 1, can be examples of the object handling unit 328. In general, the object handling unit 328 can be located adjacent to the object source 114 for performing the task.

The object handling unit 328 can include an end-effector 332 connected to a robotic arm 330. The robotic arm 330 can include structural members, joints between the members, or a combination thereof configured to manipulate the end-effector 332. The end-effector 332 is the portion of object handling unit 328 that contacts the object, holds the object, or a combination thereof. For example, FIG. 3 illustrates the end-effector 332 holding the target object 112.

The end-effector 332 can be manipulated by operating the actuation devices 212 of FIG. 2 connected to the structural members of the robotic arm 330, the joints of the robotic arm 330 or a combination thereof. The end-effector 332 can be operated to grab or release objects by operating one or more of the actuation devices 212 associated with or attached to one or more portions of the end-effector 332. The end-effector 332 can include a gripping device 334, which is a device configured to grip and release an object, thereby securing, affixing, or releasing the object to or from the end-effector 332.

In some embodiments, the gripping device 334 can be an astrictive or a suction gripper configured to hold or affix object via attractive forces, such as achieved by forming and maintaining a vacuum condition between the gripping device 334 and the object. For example, the gripping device 334 can include a set of suction cups 336 configured to contact a surface of the target object 112 and form/retain the vacuum condition in the spaces between the suction cups 336 and the surface. The vacuum condition can be created when the gripping device 334 is lowered via the robotic arm 330, thereby pressing the suction cups 336 against the surface of the target object 112 and pushing out gases between the opposing surfaces. When the robotic arm 330 lifts the gripping device 334, a difference in pressure between the spaces inside the suction cups 336 and the surrounding environment can keep the target object 112 attached to the suction cups 336. Accordingly, a degree of grip or attachment of the gripping device 334 on the target object 112 can be based on the number of the suction cups 336 successfully creating and holding the vacuum condition.

In some embodiments, the gripping device 334 can be an impactive gripper (not shown) configured to physically grasp the target object 112 via direct impact. For example, the gripping device 334 can include gripper jaws (not shown) configured to grip the target object 112 based on applying opposing or compressing forces on the target object 112. The target object 112 can be gripped based on the resulting friction between contacting surfaces of the gripper jaws and the target object 112. For illustrative purposes, the gripping device 334 is shown as a set of the suction cups 336, although it is understood that the gripping device 334 can instead be the impactive gripper.

The object handling unit 328 can include one or more of the sensor units 216. For example, one or more of the imaging devices 222, one or more of the system sensors 224, one or more of the contact sensors 226 or a combination thereof can be attached to or integrated with the object handling unit 328. In some embodiments, an instance of the imaging devices 222 can be attached to the end-effector 332 to provide imaging information from the perspective of the end-effector 332. In some embodiments, the imaging devices 222 can be configured to function as the object scanner, such as a barcode scanner or a QR code scanner, which can scan the unique identifier of the target object 112.

In some embodiments, the object handling unit 328 can include the system sensors 224 of FIG. 2 attached to or integrated with various components of the object handling unit 328, such as structural member and joins of the robotic arm 330, the end-effector 332, or a combination thereof. For example, the system sensors 224 can be configured to detect positions to track locations and orientations of the robotic arm 330, the end-effector 332, or a combination thereof.

In some embodiments, the object handling unit 328 can include the contact sensors 226 of FIG. 2, such as force, pressure, torque, and/or other tactile sensors, attached to or integrated with the gripping device 334. For example, the contact sensors 226 can include touch or tactile sensors configured to indicate whether sensed surfaces are contacting another surface and/or configured to determine the size of the surface area contacting another surface. In another example, the contact sensors 226 can include pressure sensors configured to measure the pressure, such as the vacuum condition, inside the suction cups 336. In a further example, the contact sensors 226 can include linear force sensors configured to measure the weight, as illustrated by dashed arrow, of the target object 112 borne or supported by the gripping device 334. In yet a further example, the contact sensors 226 can include torque sensors configured to measure torque on the gripping device 334, the robotic arm 330, or a combination thereof.

In some embodiments, the robotic system 100 can include one or more of the imaging devices 222 positioned around the object source 114. For example, the imaging devices 222 can be directed at the object source 114 or an area that includes the object source 114. In some embodiments, the imaging devices 222 can be configured to function as the object scanner, such as a barcode scanner or a QR code scanner, which can scan the unique identifier 310 of the target object 112.

The robotic system 100 can include, utilize, or a combination thereof one or more of the sensor units 216, including the imaging devices 222, the system sensors 224, the contact sensors 226, or a combination thereof, to generate sensor information 340 for the object source 114, the source objects 302, or a combination thereof. For example, the sensor information 340 can include imaging sensor information 342, contact sensor information 344, or a combination thereof for the object source 114, the source objects 302, or a combination thereof. Examples of the imaging sensor information 342 can include imaging data, such as a captured image or a point cloud/depth map of the object source 114. Example of the contact sensor information 344 can include pressure, force, torque measurements, or a combination thereof.

In general, initially, the robotic system 100 does not have knowledge of the identities of the source objects 302 for the particular object source 114, such as when the object source 114 is first presented to the robotic system 100. More specifically, the robotic system 100 does not have knowledge as to which instance of the source objects 302 corresponds to a specific instance of the registered object 306. The robotic system 100 can analyze the sensor information 340 to identify detectable source objects 350 from the source objects 302. The detectable source objects 350 are instances of the source objects 302 that are positioned in or on the object source 114 such that the sensor units 216 are able to gather information about the source objects 302. More specifically, the detectable source objects 350 are instances of the source objects 302 that are able to be contacted by portions of the object handling unit 328 that include the sensor units 216, within range of or in the field of view of the sensor units 216, or a combination thereof. For example, the detectable source objects 350 can be the instances of the source objects 302 that are externally located or arranged on or in the object source 114. As illustrated in FIG. 3, the source objects 302 labeled "II, IV, V, and VI" can be the detectable source objects 302 since they are perceivable by the imaging devices 222 while the source objects 302 labeled "VII" and "VIII" are not perceivable by the imaging devices 222 because they are obstructed by the other instances of the source objects 302. Details regarding identification of the detectable source objects 350 will be described below.

The robotic system 100 can analyze the sensor information 340 to identify one or more detectable object properties 352 for the detectable source objects 350. In general, the detectable object properties 352 can be information about physical properties of the detectable source objects 350 that are derived through analysis of the sensor information 340. For example, the detectable object properties 352 can include imaging properties 354, contact properties 356, or a combination thereof.

The imaging properties 354 are properties of the detectable source objects 350 derived from the imaging sensor information 342. For example, the imaging properties 354 can include the unique identifier 310, the shape profile 312, the object dimensions 314, the surface design schemes 316, location or relative position of the detectable source objects 350 on or in the object source 114, the pose of the detectable source objects 350, or a combination thereof.

The contact properties 356 are properties of the detectable source objects 350 derived from the contact sensor information 344. Examples of the detectible source objects 302 can include the object rigidity 322, the exterior material composition 320, the object surface texture, the object weight 318, the center of mass, or a combination thereof.

In general, identification of the detectable source objects 350 based on the detectable object properties 352 alone can yield inconclusive and inaccurate results. Furthermore, matching the limited number of available instances of the detectable object properties 352 for each of the detectable source objects 350 to a master list of all possible objects handled by the robotic system 100 can be an inefficient consumption of time and processing resources.

To that end, the robotic system 100 can generate an object identity approximation 360 for the detectable source objects 350 based on the object set 304. The object identity approximation 360 is an approximation as to which of the object entries 306 the detectable source objects 350 can be. For example, the object identity approximation 360 can include an indicator of the object entries 306 that the detectable source objects 350 are most likely to be. It has been discovered that the use of the object set 304 to generate the object identity approximation 360 improves the efficiency and speed for identifying the detectable source objects 350 by limiting the possible identities for each of the detectable source objects 350 from all possible objects within a master list of objects just to the object entries 306 of the object set 304. For example, in some implementations, the robotic system 100 can generate the object identity approximation 360 based on the detectable object properties 352 and the object set 304, and more specifically, the object entry properties 308 of the object entries 306 in the object set 304. As a specific example, the object identity approximation 360 for one of the detectable source objects 350 can correspond to one of the object entries 306 when one or more of the detectable object properties 352 match with one or more of the object entry properties 308. Thus, it has been discovered that the robotic system 100 that can identify the detectable source objects 350 based on the object entries 306 of the object set 304 can improve efficiency, speed, and accuracy of operation by limiting the number of possible identities for each detectable source objects 350.

In some situations, depending on the identified number of the detectable object properties 352 and the number of the object entry properties 308, the detectable source objects 350 can potentially include more than one instance of the object identity approximation 360, which indicates matches with multiple instances of object entries 306. In these situations, the degree to which the object identity approximation 360 of the detectable source objects 350 corresponds with one of the object entries 306 can be indicated by an object match probability 362. The object match probability 362 is a measure of the degree of certainty for the object identity approximation 360. More specifically, the object match probability 362 can be a measure of the correlation certainty between the detectable object properties 352 and the object entry properties 308. For example, a higher value of object match probability 362 correlates to a higher certainty of the object identity approximation 360.

In some embodiments, the object match probability 362 can be calculated based on a property correlation 364 between the detectable source objects 350 and the object entry properties 308. The property correlation 364 is an indicator for whether a specific instance of the detectable object properties 352 for one of the detectable source objects 350 matches with the corresponding instance of the object entry properties 308 for one of the object entries 306. In general, the property correlation 364 for one of the detectable object properties 352 can be determined as positive when the detectable object properties 352 matches the corresponding instance of the object entry properties 308 and negative when the detectable object properties 352 does not matches the corresponding instance of the object entry properties 308. As a specific example, the property correlation 364 can indicate a match for the shape profile 312 when both the detectable object properties 352 of the detectable source objects 350 and the object entry properties 308 of the object entries 306 is a box.

In some embodiments, the robotic system 100 can calculate the object match probability 362 for the detectable source objects 350 to account for the uniqueness for one or more of the object entry properties 308. For example, the unique identifier 310 is an instance of the object entry properties 308 that provides a high degree of uniqueness that can enable the robotic system 100 to distinguish one of the source objects 302 from the other instances of the source objects 302. Conversely, for example, if each of the object entries 306 includes the shape profile 312 of a box, then the object entry properties 308 of the shape profile 312 will have a low degree of uniqueness. As a further example, the robotic system 100 can account for the uniqueness of a group or combination of the object entry properties 308. For instances, when each of the object entries 306 includes the shape profile 312 of a box, the combination of the object dimensions 314, surface design schemes 316, or other instances of the object entry properties 308 can be combined to distinguish one of the object entries 306 from another instance of the object entries 306.

In some situation, each of the detectable source objects 302 can be matched to more than one of the object entries 306, where each of the matches can have different values of the object match probability 362. The different values of the object match probability 362 is illustrated by the detectable source objects 350 labeled "II" as shown with the object match probability 362 for "object B" in the object set 304 as "10%" and the object match probability 362 for "object C" in the object set as "70%" while the detectable source object 350 labeled "III" is shown with the object match probability 362 for "object B" as "60%" and "object C" as "30%". In general, the object match probability 362 corresponding to a specific instance of the registered objects 304 will increase as more of the detectable object properties 352 for the detectable source objects 350 become available, such as due to exposure to or measurements by the sensor units 216.

The robotic system 100 can select the target object 112 from the detectable source objects 350 of the object source 114 as the target of a task to be performed by the object handling unit 328. For example, the robotic system 100 can select the target object 112 according to a predetermined sequence, set of rules, templates of object outlines, or a combination thereof. As a specific example, the robotic system 100 can select the target object 112 as an instance of the detectable source objects 350 that are accessible to the end-effector 332, such as an instance of the detectable source objects 350 located on top of the source objects 302, according to the point cloud/depth map representing the distances and positions relative to a known location of the image devices 222. In another specific example, the robotic system 100 can select the target object 112 as an instance of the detectable source object 350 located at a corner or edge and have two or more surfaces that are exposed to or accessible to the object handling unit 328. In a further specific example, the robotic system 100 can select the target object 112 according to a predetermined pattern, such as left to right or nearest to furthest relative to a reference location, without or minimally disturbing or displacing other instances of the source objects 302. The target objects 112 can be described by the detectable object properties 352.

In some embodiments, the robotic system 100 can verify the object identity approximation 360 based on additional instances of the sensor information 340. For example, the robotic system 100 can utilize the contact sensor information 344 to determine instances of the detectable object properties 352 that would not be possible or not effectively determined by the imaging devices 222, such as the object weight 318, the object rigidity 322, the exterior material composition 320, or a combination thereof. To continue the example, the robotic system 100 can use the detectable object properties 352 based on the contact sensor information 344 to possibly increase the object match probability 362 to a degree of certainty that verifies or positively identifies the object identity approximation 360 as the corresponding instance of the object entries 306. As a specific example, the object weight 318 of the target object 114 can be determined from the contact sensors information 344 during a lifting operation of the target object 114 by the object handling unit 328, which can be used to increase the object match probability 362 with one or more of the object entries 306 that have a corresponding value of the object weight 318 as the target object 114.

In another example, the robotic system 100 can utilize a further instance of the imaging devices 222 to scan the unique identifier in the case where the unique identifier 310 had been previously obscured or unscannable. Since the unique identifier 310 is specific to a particular instance of the object entries 306, scanning the unique identifier 310 of the detectable source object 350 increases the object match probability 362 to a degree of certainty that verifies the object identity approximation 360 as the corresponding instance of the object entries 306. In general, the additional instances of the sensor information 340 can be obtained through or following direct contact between the object handling unit 328 and the target object 112. For example, the robotic system 100 can determine the detectable object properties 352 of the unique identifier 310 by manipulating the target object 112 with the object handling unit 328 to expose the unique identifier 310 to the imaging devices 222.

In general, verification of the object identity approximation 360 for the target object 114 and other instances of the source objects 302 can be used by the robotic system 100 to increase the accuracy of the object identity approximation 360 of the remaining instances of the detectable source objects 350. For example, as illustrated in FIG. 3, the target object 114, labeled as "object I", has been positively identified with the object identity approximation 360 as "object A" in the object set 304, and thus, the possibility for object identity approximation 360 for the detectable source objects 350 "II" and "III" as "object A" has been eliminated. Details regarding verification of the object identity approximation 360 will be discussed below.

The robotic system 100 can include a system operation unit 366. The system operation unit 366 is a unit that provides the functionality to analyze information and generate instructions to perform the operations of the robotic system 100. For example, the system operation unit 336 can generate instructions for operating the object handling unit 328, the sensor units 216, or a combination thereof. As another example, the system operation unit 336 can receive and analyze information, such as the object set 304 and the sensor information 340 to identify the detectable source objects 350, generate the object identity approximation 360, and other functions as described above. In some embodiments, the system operation unit 336 can include one or more of the units of FIG. 2, such as the control unit 202, the storage unit 204, the communication unit 206, the system interface 208, or a combination thereof.

In some embodiments, the system operation unit 336 can interface with other units in the robotic system 100, such as the object handling unit 328, the sensor units 216, other instances of the system operation unit 336, or a combination thereof through the communication path 218. For example, the system operation unit 336 can include an instance of the communication unit 206 to transmit operation instructions to the object handling unit 328, receive the sensor information 340 from the sensor units 216, receive the object set 304 from another instance of the system operation unit 336, or a combination thereof.

For illustrative purposes, the robotic system 100 is shown with a single instance of the system operation unit 366 coupled to the object handling unit 328 and the sensor unit 216, although it is understood that robotics system 100 can include more than one instance of the system operation unit 366 in different configurations. For example, in some embodiments, the robotic system 100 can include an instance of the system operation unit 366 coupled to the sensor units 216 and another instance of the system operation unit 366 coupled to the object handling unit 328. Additional details regarding functions of the system operation unit 366 will be described below.

Figure 4:
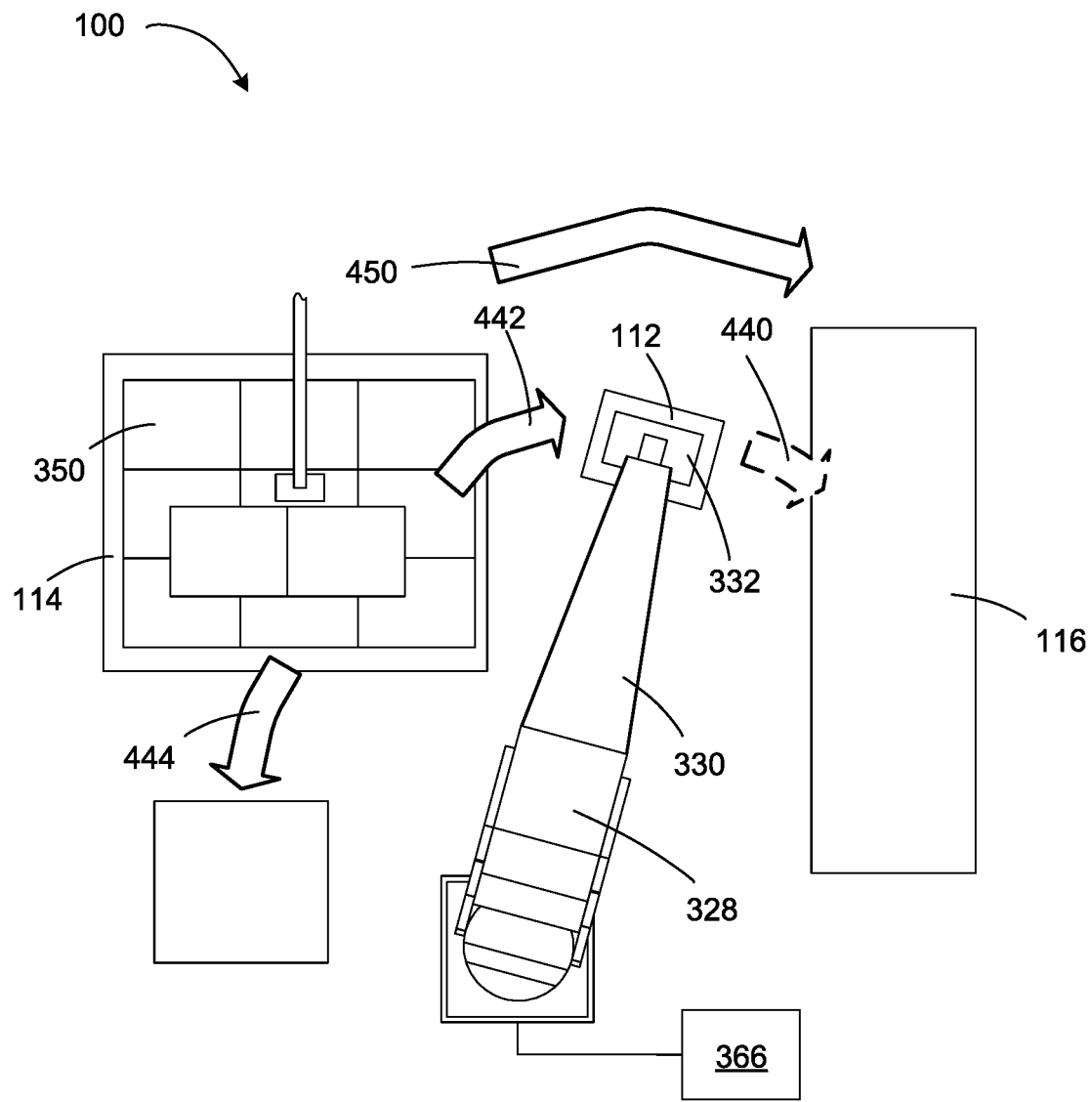
FIG. 4 is a top view illustrating an example of the robotic system in executing an object handling task in accordance with one or more embodiments of the present invention.

Referring now to FIG. 4, therein is a top view illustrating an example of the robotic system 100 in executing an object handling task 440 in accordance with one or more embodiments of the present invention. The object handling task 440 represents a sequence of actions executed by the robotic system 100, which can include the object handling unit 328, to achieve a goal. As illustrated by the dashed arrow in FIG. 4, for example, the object handling task 440 can include moving the target object 112 from the object source 114 to the task location 116, however it is understood that the object handling task 440 can be different in scope, such as sorting of the source objects 302 of FIG. 3 by transferring the source objects 302 to different instances of the task location 116 according to the object entry properties 308 of FIG. 3.

As a specific example, the object handling task 440 can include one or more operations executed in series or parallel, such as scanning the object source 114, identifying the detectable source objects 350, determining the object identity approximation 360 of FIG. 3 for the detectable source objects 350, and selecting the target object 112 from the object source 114 as describe in FIG. 3 above. As a further specific example, the object handling task 440 can include executing an object handling strategy 442, implement an error detection protocol 444, executing a task motion plan 450, or a combination thereof.

The object handling strategy 442 is a set of operational parameters to control how the object handling unit 328 interacts with the target object 112 according to the corresponding instances of the object entry properties 308 of FIG. 3. For example, the various operational parameters of the object handling strategy 442 can include where to and how to grip the target object 112; how to transport and move the target object 112; required clearance for the target object; pathing when transporting the target object 112 from the object source 114 to the task location 116; or a combination thereof. Examples of the object entry properties 308 used to generate the object handling strategy 442 can include the object dimensions 314 of FIG. 3; the object weight 318 of FIG. 3; the object rigidity 322 of FIG. 3; the deformation mode 324 of FIG. 3; the deformation degree 326 of FIG. 3; the object contents of FIG. 3; or a combination thereof.

In general, generating the object handling strategy 442 for the detectable source objects 350 of FIG. 3 based on the contact sensor information 344 of FIG. 3, the imaging sensor information 342 of FIG. 3, or a combination thereof without reference to the object set 304 of FIG. 3 does not account for properties of the target objects 112 that cannot be readily determined through the sensor information 340 of FIG. 3 alone, such as the object contents, the object rigidity 322, the deformation mode 324, or deformation degree 326. However, it has been discovered that generating the object handling strategy 442 based on the object identity approximation 360 that are correlated to the object entries 306 of the object set 304 enables the robotic system 100 to optimize the object handling strategy 442 to account for a wider range of the detectable object properties 352.

In the case for the object entry properties 308 of the object dimensions 314, as an example, the object handling strategy 442 can include instructions to set boundaries for range of movement for the target object 112, modes of movement of the target object 112, or a combination thereof. For example, the object handling strategy 442 can include instructions to provide clearance of the target object 112 according to the object dimensions 314 during rotation or movement of the target object 112 to prevent portions of the target object 112 from unintentionally contacting other objects or structures.

In the case for the object entry properties 308 of the object weight 318, as an example, the object handling strategy 442 can include instructions to limit the maximum speed and rates of acceleration and deceleration. For example, objects above a specified weight limit can be handled at a speed that is lower than objects that are below the specified weight limit. Similarly, for example, the rates of acceleration and deceleration of objects above a specified weight limit can be more gradual than objects that are below the weight limit.

In the case for the object entry properties 308 of the object rigidity 322, as an example, the object handling strategy 442 can include instructions to limit the amount of grip pressure that can be applied to the target object 112 by the gripping device 334 of the object handling unit 328. For example, the object handling strategy 442 can include limitations on the contact pressure applied by the end-effector 332 or the amount of force applied by the gripping device 334 of FIG. 3 when contacting the target object 112.

In the case for the object entry properties 308 of the deformation mode 324, as an example, the object handling strategy 442 can include instructions on a grip position on the target object 112 to limit or minimize the amount of shape distortion, such as bending or sagging, of the target objet 112. For example, the object handling strategy 442 can include instructions to grab or lift the target object 112 near the center of mass rather than an edge away from the center of mass to minimize bending or sagging of the target object 112.

In the case for the object entry properties 308 of the deformation degree 326, as an example, the object handling strategy 442 can include added range of motion to accommodate for an expected amount of shape change, such as elongation, when handling the target object 112. For example, the object handling strategy 442 can include instructions to increase the height that the target object 112 is lifted from or off the object source 114 from a resting state to provide additional clearance when moving the target object 112.

In the case for the object entry properties 308 of the object contents, as an example, the object handling strategy 442 can include instructions to limit the maximum speed for objects that can be sensitive speed or motion. For example, the object contents, such as fragile objects or liquids can be handled at lower speeds compared to non-fragile objects or solid objects.

In another implementation, for the object entry properties 308 of the object content, as an example, the object handling strategy 442 can include instructions that limit the rates of acceleration and deceleration for objects that can be sensitive to quick or sudden changes in speed or motion. For example, the object contents, such as fragile objects or liquids can be handled at rates of acceleration that limit sudden or sharp changes in momentum.

The error detection protocol 444 is an action taken by the robotic system 100 when an error is detected during the object handling task 440. For example, the error detection protocol 444 can be implemented when an inconsistency between one or more of the object entry properties 308 and one or more of the detectable object properties 352 is detected. More specifically, the error detection protocol 444 can be implemented in the situation where the object identity approximation 360 has been verified as a specific instance of the object entries 306, such matching of the unique identifier 310 of FIG. 3, but one or more of the object entry properties 308 is inconsistent with one or more of the detectable object properties 352. An example of the inconsistency that triggers the error detection protocol 444 can include a difference between the object weight 318 of the registered object 306 in the object set 304 and the object weight 318 for the target object 112 as determined by the contact sensors 226 of FIG. 2.

In some embodiments, the error detection protocol 444 can include ceasing execution of the object handling task 440 upon error detection. In some embodiments, the error detection protocol 444 can include replacing the target object 112 in or on the object source 114. In some embodiments, the error detection protocol 444 can include transport of the target object 112 to a designated location for inspection of the target object 112. In some embodiments, the error detection protocol 444 can include soliciting operator input. For example, the robotic system 100 can generate an operator notifier to alert another system or the human operator to the occurrence of the error detection.

The task motion plan 450 corresponds to one or more actions that will be implemented by the corresponding unit to execute the object handling task 440. In the situation illustrated in FIG. 4, the task motion plan 450 is for transferring the target object 112 from the object source 114 to the task location 116. For example, the task motion plan 450 for the object handling unit 328 can include positioning the end-effector 332 for pickup, gripping the target object 112, lifting the target object 112, transferring the target object 112 from above the object source 114 to above the task location 116, lowering the target object 112, and releasing the target object 112. The task motion plan 450 can incorporate the object handling strategy 442 during execution of the task motion plan 450.

In some embodiments, the task motion plan 450 can include a sequence of commands or settings for one or more of the actuation devices 212 of FIG. 2 that operate the robotic arm 330, the end-effector 332, or a combination thereof. For example, the task motion plan 450 can include the commands or settings to place the gripper at a particular location about the object source 114, engage and grab the target object 112 with the end-effector 332 according to the object handling strategy 442, place the end-effector 332 at a particular location about the task location 116, and release the target object 112 from the end-effector 332.

In some embodiments, the system operation unit 366 can generate the instructions to operate the object handling unit 328. For example, the system operation unit 336 can generate the object handling strategy 442, calculate the task motion plan 450, invoke the error detection protocol 444, or other associated functions.

Figure 5:
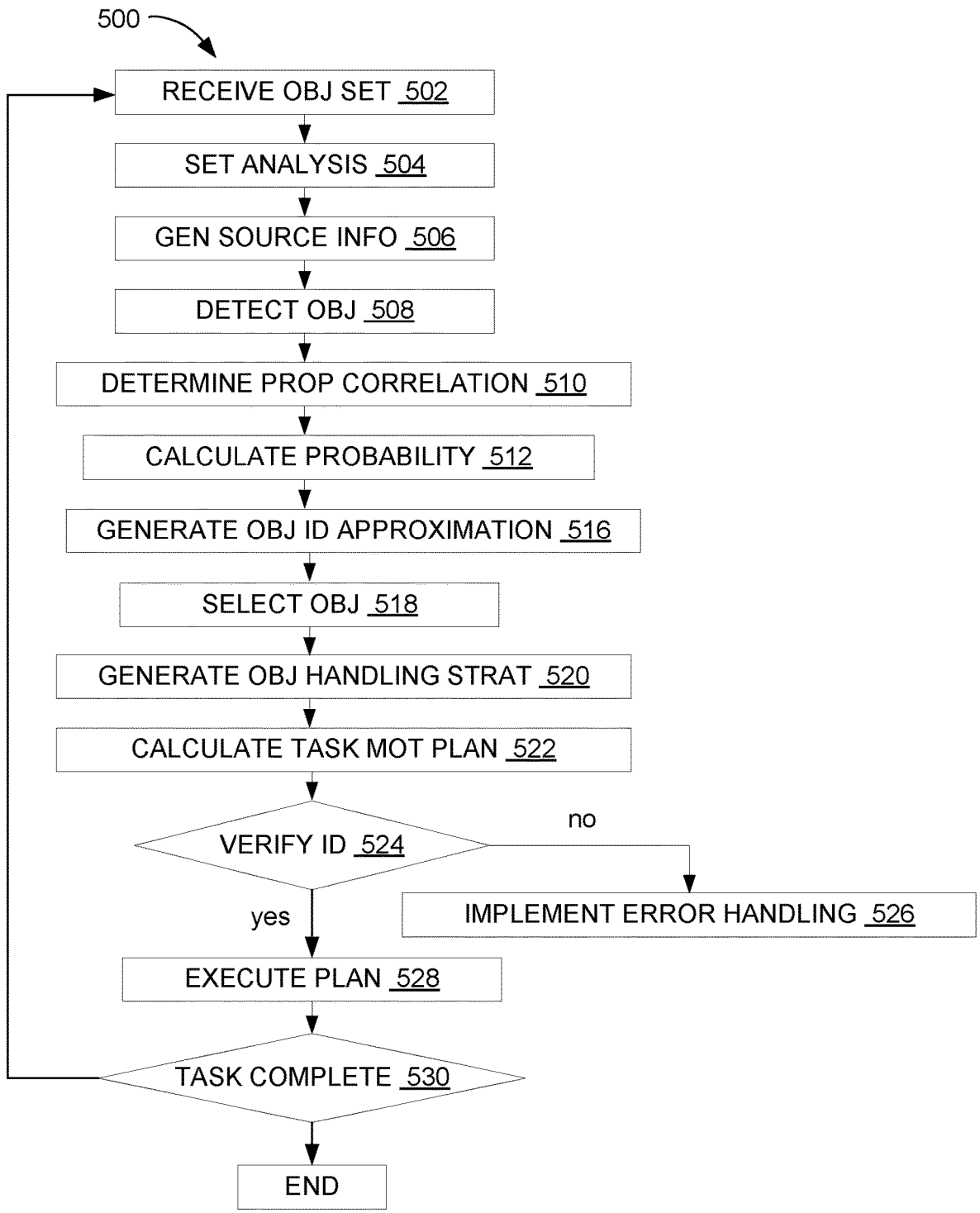
FIG. 5 is a flow diagram for a method of operating the robotic system of FIG. 1 in accordance with one or more embodiments of the present invention.

Referring now to FIG. 5, therein is shown a flow diagram for a method 500 of operating the robotic system 100 of FIG. 1 in accordance with one or more embodiments of the present invention. The method 500 can be for identifying the target object 112 of FIG. 1, implementing granular control and manipulation of the target object 112, or a combination thereof according to the object set 304 of FIG. 3. The method 500 can be implemented based on executing the instructions stored on one or more of the storage unit 204 of FIG. 2, with one or more of the control unit 202 of FIG. 2, or a combination thereof. Further, the following description of the method 500 is described with respect to the units of FIG. 2, such as the control unit 202, the storage unit 204, and the communication unit 206, however it is understood that the method can be implemented by one or more instances of the system operation unit 336 of FIG. 3 that can include various combination and numbers of the control unit 202, the storage unit 204, and the communication unit 206.

At block 502, the robotic system 100 can receive the object set 304. For example, the robotic system 100 can receive the object set 304 that is associated with a particular instance of the object source 114. In one embodiment, the control unit 202 of the robotic system 100 can be provided the object set 304 through the communication unit 206 or through access to the storage unit 204.

At block 504, the robotic system 100 can analyze the object set 304 to identify the uniqueness of one or more of the object entry properties 308 of FIG. 3. For example, the control unit 202 can identify the unique identifier 310 as an instance of object entry properties 308 that provides a high degree of uniqueness that can enable the robotic system 100 to identify one of the detectable source objects 350. In another example, the control unit 202 can identify groupings or combination of the object entry properties 308 that are unique to a subset or group of the object entries 306 among many other instances of the object entries 306 in the object set 304. Conversely, instances of the object entry properties 308 that are common among many of the object entries 306 can have a low degree of uniqueness. For example, the control unit 202 can determine that the object entry properties 308 of the shape profile 312 is a low degree of uniqueness when the shape profile 312 for all of the object entries 306 are boxes.

The uniqueness of the object entry properties 308 or group of the object entry properties 308 can be analyzed dynamically. For example, the control unit 202 can reanalyze the register object properties 308 as the source objects 302 are removed from the object source 114 to determine if additional groupings or combination of the object entry properties 308 have become increasingly unique as the number of remaining instances of the source objects 302 decreases.

In block 506, the robotic system 100 can generate a scan instruction to scan the object source 114, the source objects 302, or a combination thereof to generate the sensor information 340 of FIG. 3. In one implementation, the control unit 202 of the robotic system 100 can transmit a scan instruction, such as through the communication unit 206, to the sensor units 216 to generate the sensor information 340 about the object source 114. For example, the robotic system 100 can implement the control unit 202 to generate the scan instruction to utilize the imaging devices 222 of FIG. 2 located around and directed towards the object source 114 to generate the imaging sensor information 342 of FIG. 3. In an embodiment, the control unit 202 can receive the imaging sensor information 342 from the imaging devices 222, such as through the communication unit 206. In some embodiments, the control unit 202 can receive the imaging sensor information 342 that can include digital images, point clouds, depth maps, or a combination thereof of one or more external facing surfaces of the source objects 302 exposed from the object source 114. As another specific example, the imaging sensor information 342 can include thermal imaging information, x-ray imaging information, two-dimensional mapping, three-dimensional mapping, or a combination thereof. In another implementation, the control unit 202 can receive the imaging sensor information 202 as raw, unprocessed, or partially processed imaging information from multiple instances of the imaging devices 222, which can be analyzed by the control unit 202 to generate the point clouds, depth maps, two-dimensional maps, three-dimensional maps, or a combination thereof.

In block 508, the robotic system 100 can analyze the imaging sensor information 342 to identify the detectable source objects 350. For example, in one implementation, the control unit 202 can analyze imaging sensor information 342 to identify the detectable source objects 350 with a pattern recognition mechanism, a set of rules to identify object outlines, such as perimeter edges or surfaces, or a combination thereof. To continue the example, control unit 202 can further identify groupings of outlines, such as according to predetermined rules, pose templates, or a combination thereof, as corresponding to the detectable source objects 350. To further the example, the control unit 202 can identify the groupings of the object outlines that correspond to a pattern, such as a same value or varying at a known rate or pattern, in color, brightness, depth, location, or a combination thereof across the object lines. Also, for example, the control unit 202 can identify the groupings of the object outlines according to predetermined shape or pose templates defined in the master data 246 of FIG. 2. As a specific example, the control unit 202 can map the imaging sensor information 342 as the imaging properties 354 of FIG. 3 to one or more of the detectable object properties 352, such as the unique identifier 310 of FIG. 3, the shape profile 312 of FIG. 3, the object dimensions 314 of FIG. 3, the surface design schemes 316 of FIG. 3, location or relative position of the detectable source objects 350 on or in the object source 114, the pose of the detectable source objects 350, or a combination thereof.

In block 510, the robotic system 100 can determine the property correlation 364 of FIG. 3 between the detectable object properties 352 of the detectable source objects 350 and the object entry properties 308 of the object entries 306. In an example implementation, the control unit 202 can compare one of the detectable object properties 352 for a specific instance of detectable source objects 350 with the object entry properties 308 for each of the detectable source objects 302 to determine if the property correlation 364 is positive, indicating a match, or negative, indicating a non-match. To continue with the example implementation, for the specific instance of the detectable source objects 302, the control unit 202 can repeat the comparisons between each of the detectable object properties 352 and the object entry properties 308 for each of the object entries 306 in the object set 304. As a specific example, for a specific instance of the detectable source objects 302, the control unit 202 can compare one instance of the detectable object properties 352, such as the shape profile 312, to the shape profile 312 for each of the object entries 306 in the object set 304 to determine if the property correlation 364 is positive or negative. For instance, the control unit 202 can determine that the property correlation 364 for the shape profile 312 is positive if both the detectable source objects 350 and the registered object 306 are boxes. To continue the specific example, the control unit 202 can continue the iterative comparison for each currently available instance of the detectable object properties 352 of the specific instance of the detectable source objects 302 to the corresponding instances of the object entry properties 308 for each of the object entries 306 in the object set 304.

In block 512, the robotic system 100 can calculate the object match probability 362 for the detectable source objects 350. For example, the control unit 202 can calculate the object match probability 362 based on the property correlation 364 between the detectable object properties 352 and the object entry properties 308 of the object entries 306 in the object set 304. In some embodiments, the control unit 202 can calculate the object match probability 362 as a percentage based on the number of positive instances of the property correlation 364 between the detectable object properties 352 and the object entry properties 308 of the object entries 306. For example, in one implementation, the control unit 202 can calculate the object match probability 362 as a percentage of the number the positive instances of property correlation 364 to the total number of the object entry properties 308 that are included in the object set 302 for a particular instance of the object entries 306. As a specific example, in the situation where the robotic system 100 determines that an instance of the detectable source object 350 includes two positive instances of the property correlation 364, and the object entries 306 include four instances of the object entry properties 308, the control unit 202 can calculate the object match probability 362 as 50%.

In some embodiments, the control unit 202 can calculate the object match probability 362 for the detectable source objects 350 to account for the degree of uniqueness for one or more of the object entry properties 308. For example, certain instances or combination of the object set properties 308 that have a higher degree of uniqueness, such as the unique identifier 310, can be weighted higher than the object set properties 308 with a lower degree of uniqueness, such as those that are common among many of the object entries 306, when calculating the object match probability 362. As a specific example, the control unit 202 can calculate the object match probability 362 as a high percentage value for the positive instance of the property correlation 364 between the unique identifier 310 of an instance of the detectable source objects 350 and the unique identifier 310 of one of the object entries 306.

In some embodiments, the control unit 202 can calculate the object match probability 362 as a zero match probability when the negative instance of the property correlation 364 exists between one or more of the detectable object properties 308 and the corresponding instance of the object entry properties 308. The object match probability 362 of the zero match probability between a specific instance of the detectable source objects 350 and a specific instance of the object entries 302 indicates that a specific instance of the detectable source objects 350 does not correspond to a specific instance of the object entries 302. As an example, the control unit 202 can calculate the object match probability 362 as the zero match probability when the negative instance of the property correlation 364 exists between the unique identifier 310, the shape profile 312, the object dimensions 314, the surface design scheme 316, or a combination thereof for the detectable source object 350 and the corresponding instances of the object entry properties 308 for a specific instance of the object entries 306. As a specific example, the detectable source object 350 having the shape profile 312 of a tube can be calculated to have the object match probability 362 as the zero match probability when compared to the instances of the object entries 306 having the shape profile 312 of a box.

In some situations, the control unit 202 can calculate the object match probability 362 as the zero match probability despite a determination of positives instances of the property correlation 364 between some instances of the detectable object properties 352 and the object entry properties 308. For example, the control unit 202 can calculate the zero match probability of the object match probability 362 despite a determination of positives instances of the property correlation 364 when the control unit 202 determines the negative instance of the property correlation 362 for one of the detectable object properties 352. In another example, the control unit 202 can calculate the zero match probability of the object match probability 362 despite a determination of positives instances of the property correlation 364 when the robotic system 100 determines that the instance of the source object 302 corresponding to one of the object entries 306 has been removed from the object source 114, and thus the detectable source objects 350 cannot be matched with the particular instance of the object entries 306.

In block 516, the robotic system 100 can generate the object identity approximation 360 of FIG. 3 for the detectable source objects 350. In some embodiments, the control unit 202 can generate the object identity approximation 360 based on the object match probability 362 of the detectable source objects 350. In some embodiments, the control unit 202 can generate multiple instances of the object identity approximation 360 for one of the detectable source objects 350 based on the number of generated instances of the object match probability 362 specific to that instance of the detectable source objects 350. For example, in some circumstances, the robotic system 100 can generate multiple instances of the object match probability 362 based on the currently available instances of the property correlation 364, which indicates matches with multiple instances of the object entries 306. In these circumstances, control unit 202 can generate an instance of the object identity approximation 360 for each generated instances of the object match probability 362 and rank each of the object identity approximation 360 according to the corresponding value of the object match probability 362. In some embodiments, the control unit 202 can generate the object identity approximation 360 as the instance of the object entries 306 corresponding to the object match probability 362 having the highest value, since a higher value of object match probability 362 can correlate to a higher certainty of the object identity approximation 360.

In some embodiments, the control unit 202 can generate the object identity approximation 360 for the detectable source objects 350 based on a comparison of the object match probability 362 for each of the detectable source objects 350. As an example, the comparison of the object match probability 362 for each of the detectable source objects 350 can be specific to a particular instance of the object entries 306. In an exemplary implementation, for each of the detectable source objects 350 that include the object match probability 362 that is not the zero match probability with a specific instance of the object entries 306, the control unit 202 can compare the object match probability 362 and generate the object identity approximation 360 to identify the detectable source object 350 that includes the highest value of the object match probability 362 corresponding to the specific instance of the object entries 306 as the specific instance of the object entries 306.

To illustrate the example, referring to the hypothetical situation as shown in FIG. 3, with respect to the particular instance of the object entries 306 of "OBJ B", the control unit 202 can compare the object match probability 362 for the detectable source objects 350 "OBJ II" of "10%" and the object match probability 362 for the detectable source objects 350 "OBJ III" of "60%". Similarly, with respect to the particular instance of the object entries 306 of "OBJ C", the control unit 202 can compare the object match probability 362 for the detectable source objects 350 "OBJ II" of "70%" and the object match probability 362 for the detectable source objects 350 "OBJ III" of "30%". To continue the illustration, for the comparison between the object match probability 362 for the detectable source objects 350 of "OBJ II" and "OBJ III", the control unit 202 can generate the object identity approximation 360 for "OBJ II" as the object entries 306 of "OBJ B" and the object identity approximation 360 for "OBJ III" as the object entries 306 of "OBJ C".

In block 518, the robotic system 100 can select the target object 112 from the detectable source objects 350 of the object source 114. For example, the control unit 202 can select the target object 112 according to a predetermined sequence, set of rules, templates of object outlines, or a combination thereof. As a specific example, control unit 202 can select the target object 112 as an instance of the detectable source objects 350 that are accessible to the end-effector 332, such as an instance of the detectable source object 350 located on top of the source objects 302, according to the point cloud, depth map, or a combination thereof representing the distances or positions relative to a known location of the imaging devices 222. As specific examples, the control unit 202 can select the target object 112 as an instance of the detectable source object 350 located at a corner or edge and have two or more surfaces that are exposed. As a further example, the control unit 202 can select the target object 112 according to a predetermined pattern, such as left to right or nearest to furthest relative to a reference location, preferably without disturbing or displacing other instances of the source objects 302.

In block 520, the robotic system 100 can generate the object handling strategy 442 of FIG. 4 for the target object 112. In some embodiments, the control unit 202 can generate the object handling strategy 442 as a set of operational parameters to control how the object handling unit 328 of FIG. 3 interacts with the target object 112 according to the corresponding instances of the detected object properties 352, the object entry properties 308, or a combination thereof. For example, the control unit 202 can apply the object entry properties 308 that correlate to the object identity approximation 360 for the target object 112 when being handled by the object handling unit 328, particularly for instances of the object entry properties 308 that the control unit 202 does not yet have information about, such as the contact properties 356. In some embodiments, in the situation that the target object 112 includes multiple instances of the object identity approximation 360, the control unit 202 can generate multiple instances of the object handling strategy 442 that correspond to each of the object identity approximation 360.

In one implementation, for the object entry properties 308 of the object dimensions 314 of FIG. 3, the control unit 202 can generate the object handling strategy 442 as instructions that set boundaries for range of movement for and modes of movement of the target object 112. For example, the control unit 202 can generate the object handling strategy 442 to include instructions to provide clearance according to the object dimensions 314 when rotating or moving to prevent portions of the target object 112 from unintentionally contacting other objects or structures.

In another implementation, for the object entry properties 308 of the object weight 318 of FIG. 3, the control unit 202 can generate the object handling strategy 442 as instructions that limit the maximum speed and rates of acceleration and deceleration. For example, instances of the target object 112 above a specified weight limit can be handled at a speed that is lower than other objects that are below the specified weight limit. Similarly, for example, the rates of acceleration and deceleration of instances of the target object 112 above a specified weight limit can be more gradual than other objects that are below the weight limit.

In further implementation, for the object entry properties 308 of the object rigidity 322 of FIG. 3, the control unit 202 can generate the object handling strategy 442 as instructions to limit the amount of grip pressure that can be applied to the target object 112 by the gripping device 334 of the object handling unit 328. For example, the object handling strategy 442 can include limitations on the contact pressure applied by the end-effector 332 or the amount of force applied by the gripping device 334 when contacting the target object 112.

In yet a further implementation, for the object entry properties 308 of the deformation mode 324 of FIG. 3, the control unit 202 can generate the object handling strategy 442 as instructions on a grip position on the target object 112 to limit or minimize the amount of shape distortion, such as bending or sagging, of the target objet 112. For example, the object handling strategy 442 can include instructions to grab or lift the target object 112 near the center of mass rather than an edge to minimize bending or sagging of the target object 112.

In yet a further implementation, for the object entry properties 308 of the deformation degree 326 of FIG. 3, the control unit 202 can generate the object handling strategy 442 to include added range of motion to accommodate for an expected amount of shape change, such as elongation, when handling the target object 112. For example, the object handling strategy 442 can include instructions to increase the height or distance that the target object 112 is lifted from or off the object source 114 from a resting state to provide additional clearance to account for elongation of the target object 112 when moving the target object 112.

In another implementation, for the object entry properties 308 of the object contents, the control unit 202 can generate the object handling strategy 442 as instructions that limit the maximum speed and rates of acceleration and deceleration for objects that can be sensitive to quick changes in speed or motion. For example, the object contents, such as fragile objects or liquids can be handled at a speeds and rates of acceleration that limit sudden or sharp changes in momentum.

At block 522, the robotic system 100 can calculate the task motion plan 450 of FIG. 4 for executing the object handling task 440 for the target object 112. For example, the control unit 202 can calculate the task motion plan 450 based on calculating a sequence of commands or settings, or a combination thereof, for the actuation devices 212 of FIG. 2 that will operate the robotic arm 330 of FIG. 3, the end-effector 332 of FIG. 3, including the gripping device 334, or a combination thereof. For some instances of the object handling task 440, the control unit 202 can calculate the sequence and the setting values that will manipulate the robotic arm 330, end-effector 332, or a combination thereof to transfer the target object 112 from the object source 114 to the task location 116. For example, the control unit 202 can implement a motion planning mechanism, which can include a process, a function, an equation, an algorithm, a computer-generated/readable model, or a combination thereof, to calculate a path in space according to one or more constraints, goals, rules, or a combination thereof. As a specific example, the control unit 202 can use A* algorithm, D* algorithm, other grid-based searches, or a combination thereof to calculate the path through space for moving the target object 112 from the object source 114 to the task location 116. The motion planning mechanism can use a further process, function, or equation, and/or a translation table, to convert the path into the sequence of commands or settings, or combination thereof, for the actuation devices 212. In using the motion planning mechanism, the control unit 202 can calculate the sequence that will operate the robotic arm 330 and the end-effector 332 to cause the target object 112 to follow the calculated path. In some embodiments, in the situation that the target object 112 includes multiple instances of the object identity approximation 360, the control unit 202 can calculate multiple instances of the task motion plan 450 that correspond to each of the object identity approximation 360.

At decision block 524, the robotic system 100 can perform a supplemental check of the object identification approximation 360. For example, the control unit 202 can generate additional instances of the detectable object properties 352, such as by interfacing with the contact sensors 226 of FIG. 2 to generate the contact sensor information 344 of FIG. 3, such as measurements of torque or force, to calculate the object weight 318 during an initial lift of the target object 112. In another example, if the unique identifier 310 of the target object 112 exists but had not yet been scanned, the control unit 202 can interface with the imaging devices 222 to identify and scan the unique identifier 310 during manipulation or handling of the target object 112. In some embodiments, the control unit 202 can use the additional instances of the detectable object properties 352 to update the object identification approximation 360 or implement the error detection protocol 444 of FIG. 4. For example, the control unit 212 can adjust the object match probability 362 for each of the object identification approximation 360 for the target object 112 by determining the property correlation 364 between the additional instances of the detectable object properties 352, such as the contact properties 356 or additional instances of the imaging properties 354, and the object entry properties 308. As a specific example, in the situation where the target object 112 includes two of the object identification approximation 360 with equal values of the object match probability 362, but the object weight 318 of the corresponding instances of the object entries 306 differ, the control unit 202 can use the contact properties 356 of the object weight 318 to determine the property correlation 364 and recalculate the object match probability 362. In some embodiments, control unit 202 can revise the object handling strategy 442, the task motion plan 450, or a combination thereof based on the updates to the object identification approximation 360.

In block 526, the robotic system 100 can determine whether implementation of the error detection protocol 444 of FIG. 4 is needed. For example, the robotic system 100 can implement the error detection protocol 444 when the control unit 202 detects an inconsistency between one or more of the object entry properties 308 and one or more of the detectable object properties 352 of the target object 112. More specifically, the control unit 202 can implement the error detection protocol 444 in the situation where the object identity approximation 360 has been verified as a specific instance of the object entries 306, such matching of the unique identifier 310, but one or more of the object entry properties 308 is inconsistent with one or more of the detectable object properties 352, such as a difference between the object weight 318 of the object entries 306 in the object set 304 and the object weight 318 for the target object 112 as determined by the contact sensors 226.

In some embodiments, the robotic system 100 can implement the error detection protocol 444 to cease execution of the object handling task 440 upon error detection, such as the detected inconsistency between the detectable object properties 352 and the registered object properties 306. In some embodiments, the robotic system 100 can implement the error detection protocol 444 to replace or return the target object 112 in, on, or to the object source 114 using the object handling unit 328 of FIG. 3. In some embodiments, the robotic system 100 can implement the error detection protocol 444 to transport the target object 112 to a designated location for inspection using the object handling unit 328. In some embodiments, the error detection protocol 444 can include soliciting operator input. For example, the robotic system 100 can generate an operator notifier to alert the human operator to the occurrence of the error detection through the communication unit 206, the system interface 208, or a combination thereof. In some embodiments, the instructions for operating the error detection protocol 444 can be generated by the control unit 202 as a further instance of the task motion plan 450 according to the objects of the error detection protocol 444 as described in the embodiments above.

In block 528, the robotic system 100 can begin executing the task motion plan 450. For example, the robotic system 100 can begin executing the task motion plan 450 by transmitting the task motion plan 450 or incremental portions of the task motion plan 450 through the communication unit 206 to the object handling unit 328 to operate the actuation devices 212 of the robotic arm 330, the end-effector 332, or a combination thereof according to the sequence of commands or settings or combination thereof In decision block 530, the robotic system 100 can determine whether the object handling task 440 has been fully executed to the end. For example, the control unit 202 interface with the object handling unit 328 to determine whether all of the actions and commands in the object handling task 440 have been completed for the target object 112 or, alternatively in the case of the error detection, the error detection protocol 444 have been completed. In some implementations, when the control unit 202 has verified that the object handling task 440 has been completed, the control unit 202 can update the object set 304 to indicate that the target object 112 corresponding to one of the object entries 306 has been removed from the object source 114 and the robotic system 100 can repeat the method 500 for a new instance of the source objects 302.

It has been discovered that updating the object set 304 to reflect removal of one of the source objects 302 corresponding with one of the object entries 306 improves the ability of the robotic system 100 to perform subsequent iterations of the object handling task 440. Updating the object set 304 to account for removal of the target object 112 reduces the number of possible instances of the object entries 306 that can be matched to the remaining instances of the source objects 302 and can further refine the object identity approximation 360, thereby improving the accuracy of object identification and operation of the robotic system 100.

The blocks of the flow diagram for the method 500 are described with respect to implementation by a single instances of the control unit 202, the storage unit 204, the communication unit 206 of FIG. 2, and the system interface 208 of FIG. 2, however it is understood that the flow diagram can be implemented by the robotic system 100 differently. For example, the blocks can be partitioned to be implemented by the units of different instances of the system operation unit 366. As a specific example, the blocks can be partitioned such that one instance of the system operation unit 366 can implement the blocks related to identification of the source objects 302 while a separate instance of the system operation unit 366 can implement the blocks associated with executing the object handling task 440. In one embodiment, the blocks related to identification of the source objects 302, which can include the receive object set block 502, the set analysis block 504, the generation source information block 506, the detect object block 508, the determine property correlation block 510, the calculate probability block 512, the generate object identity approximation block 516, or a combination thereof. In another implementation, the blocks associated with executing the object handling task 440, which can include the select object block 518, the generate object handling strategy block 520, the calculate task motion plan block 522, the verify identification decision block 524, the implement error handling block 526, the execute plan block 528, the task complete decision block 530, or a combination thereof.

Figure 6:
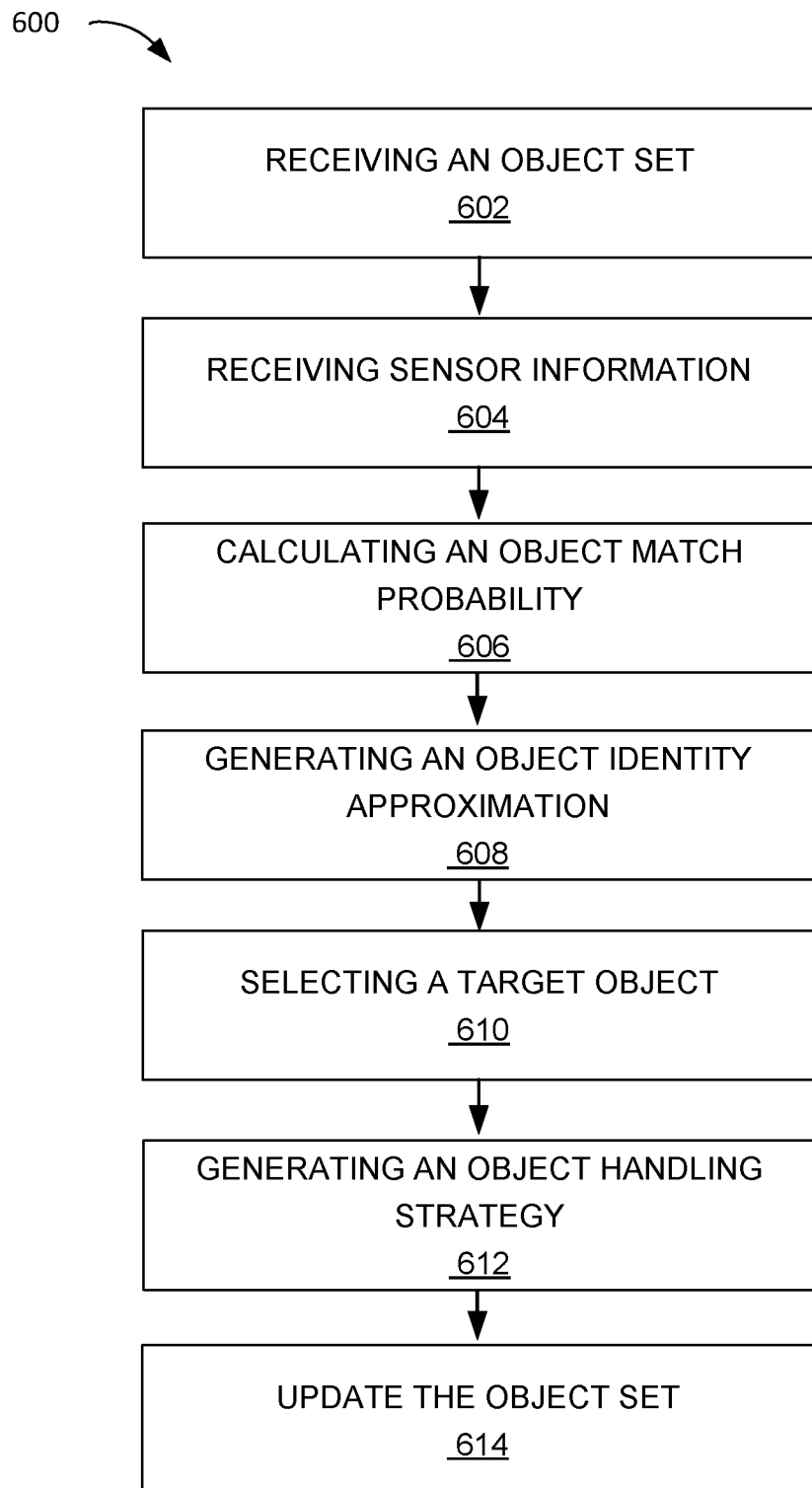
FIG. 6 is flow chart of a method of operation of a robotic system in an embodiment of the present invention.

Referring now to FIG. 6, therein is shown a flow chart of a method 600 of operation of a robotic system 100 in an embodiment of the present invention. The method 600 includes: receiving an object set of including one or more object entries, wherein: the object entries correspond to source objects of an object source, each of the object entries are described by one or more object entry properties in a block 602; receiving sensor information representing one or more detectable object properties for detectable source objects of an object source in a block 604; calculating an object match probability between the detectable source objects and the object entries based on a property correlation between the detectable object properties of the detectable source objects and the object entry properties of the object entries in a block 606; generating an object identity approximation for each of the detectable source objects based on a comparison between the object match probability for each of the detectable source objects corresponding to a particular instance of the object entries in a block 608; selecting a target object from the detectable source objects in a block 610; object handling strategy, for implementation by an object handling unit, to transfer the target object from the object source based on the object entry properties of the object entries corresponding to the object identity approximation in a block 612; and updating the object set to indicate that the target object corresponding to a specific instance of the object entries has been removed from the object source in a block 614.

The resulting method, process, apparatus, device, product, and/or system is cost-effective, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A robotic system comprising:
a control unit configured to:
receive an object set including one or more object entries, wherein:
the object entries correspond to source objects of an object source,
each of the object entries are described by one or more object entry properties;
receive sensor information representing one or more detectable object properties for detectable source objects of the object source;
calculate an object match probability between the detectable source objects and the object entries based on a property correlation between the detectable object properties of the detectable source objects and the object entry properties of the object entries;
generate an object identity approximation for each of the detectable source objects based on a comparison between the object match probability for each of the detectable source objects corresponding to a particular instance of the object entries;
select a target object from the detectable source objects;
generate an object handling strategy, for implementation by an object handling unit, to transfer the target object from the object source based on the object entry properties of the object entries corresponding to the object identity approximation, and to increase the amount the target object is lifted from the object source to accommodate for an expected amount of elongation of the target object according to the object entry properties of a deformation degree;
update the object set to indicate that the target object corresponding to a specific instance of the object entries has been removed from the object source; and
a storage unit, coupled to the control unit, configured to store the object set.

2. The system of claim 1, wherein the control unit is configured to generate the object handling strategy includes generating the object handling strategy to limit the speed, rate of acceleration, or a combination thereof according to the object entry properties of an object weight above a weight threshold.

3. The system of claim 1, wherein the control unit is configured to generate the object handling strategy includes generating the object handling strategy for limiting grip pressure applied to the target object by the object handling unit according to the object entry properties of an object rigidity.

4. The system of claim 1, wherein the control unit is configured to generate generating the object handling strategy includes generating the object handling strategy determine a grip position on the target object to minimize shape distortion of the target object according to the object entry properties of a deformation mode.

5. The system of claim 1, wherein the control unit is configured implement an error detection protocol when an inconsistency between the object entry properties and the detectable object properties of the target object are detected.

6. The system of claim 1, wherein the control unit is configured to generate a task motion plan for transferring the target object from the object source to a task location.

7. A method of robotic system comprising:
receiving an object set including one or more object entries, wherein:
the object entries correspond to source objects of an object source,
each of the object entries are described by one or more object entry properties;
receiving sensor information representing one or more detectable object properties for detectable source objects of the object source;
calculating an object match probability between the detectable source objects and the object entries based on a property correlation between the detectable object properties of the detectable source objects and the object entry properties of the object entries;
generating an object identity approximation for each of the detectable source objects based on a comparison between the object match probability for each of the detectable source objects corresponding to a particular instance of the object entries;
selecting a target object from the detectable source objects;
generating an object handling strategy, for implementation by an object handling unit, to transfer the target object from the object source based on the object entry properties of the object entries corresponding to the object identity approximation, and to increase the amount the target object is lifted from the object source to accommodate for an expected amount of elongation of the target object according to the object entry properties of a deformation degree; and
updating the object set to indicate that the target object corresponding to a specific instance of the object entries has been removed from the object source.

8. The method of claim 7, wherein generating the object handling strategy includes generating the object handling strategy to limit the speed, rate of acceleration, or a combination thereof according to the object entry properties of an object weight above a weight threshold.

9. The method of claim 7, wherein generating the object handling strategy includes generating the object handling strategy for limiting grip pressure applied to the target object by the object handling unit according to the object entry properties of an object rigidity.

10. The method of claim 7, wherein generating the object handling strategy includes generating the object handling strategy determine a grip position on the target object to minimize shape distortion of the target object according to the object entry properties of a deformation mode.

11. The method of claim 7, further comprising implementing an error detection protocol when an inconsistency between the object entry properties and the detectable object properties of the target object are detected.

12. The method of claim 7, further comprising generating a task motion plan for transferring the target object from the object source to a task location.

13. A non-transitory computer readable medium including instructions executable by a control unit for a robotic system, the instructions comprising:
  receiving an object set of object entries, wherein:
    the object entries correspond to source objects of an object source,
    each of the object entries are described by one or more object entry properties;
  receiving sensor information representing one or more detectable object properties for detectable source objects of the object source;
  calculating an object match probability between the detectable source objects and the object entries based on a property correlation between the detectable object properties of the detectable source objects and the object entry properties of the object entries;
  generating an object identity approximation for each of the detectable source objects based on comparison between the object match probability for each of the detectable source objects corresponding to a particular instance of the object entries;
  selecting a target object from the detectable source objects;
  generating an object handling strategy, for implementation by an object handling unit, to transfer the target object from the object source based on the object entry properties of the object entries corresponding to the object identity approximation, and to increase the amount the target object is lifted from the object source to accommodate for an expected amount of elongation of the target object according to the object entry properties of a deformation degree; and
  updating the object set to indicate that the target object corresponding to a specific instance of the object entries has been removed from the object source.

14. The non-transitory computer readable medium as claimed in claim 13, wherein generating the object handling strategy includes generating the object handling strategy to limit the speed, rate of acceleration, or a combination thereof according to the object entry properties of an object weight above a weight threshold.

15. The non-transitory computer readable medium as claimed in claim 13, wherein generating the object handling strategy includes generating the object handling strategy for limiting grip pressure applied to the target object by the object handling unit according to the object entry properties of an object rigidity.

16. The non-transitory computer readable medium as claimed in claim 13, wherein generating the object handling strategy includes generating the object handling strategy determine a grip position on the target object to minimize shape distortion of the target object according to the object entry properties of a deformation mode.

17. The non-transitory computer readable medium as claimed in claim 13, further comprising implementing an error detection protocol when an inconsistency between the object entry properties and the detectable object properties of the target object are detected.

* * * * *